United States Patent [19]
Cykon

[11] Patent Number: 6,010,194
[45] Date of Patent: Jan. 4, 2000

[54] METHOD AND APPARATUS FOR ASSEMBLY OF A RIDING LAWN MOWER SEAT

[75] Inventor: James Cykon, Warren, Ohio

[73] Assignee: MTD Products Inc, Cleveland, Ohio

[21] Appl. No.: 09/005,331

[22] Filed: Jan. 9, 1998

[51] Int. Cl.[7] .................................................. B60N 2/06
[52] U.S. Cl. ............................... 297/440.22; 297/344.1; 296/63; 248/429
[58] Field of Search ........................... 297/344.1, 440.22; 248/223.41, 424, 429; 296/63, 65.13

[56] References Cited

U.S. PATENT DOCUMENTS

| | | | |
|---|---|---|---|
| 2,678,681 | 5/1954 | Haltenberger | 297/344.1 |
| 3,841,696 | 10/1974 | Wagner | 297/344.1 X |
| 4,065,181 | 12/1977 | Gunlock et al. | 297/440.22 |
| 4,761,036 | 8/1988 | Vogel | 297/440.22 X |
| 4,930,593 | 6/1990 | Swartzendruber et al. | 180/89.17 |

OTHER PUBLICATIONS

Consumer Reports Magazine, Jun. 1997, Lawn Tractor Test, pp. 36–41.

*Primary Examiner*—Peter R. Crown
*Attorney, Agent, or Firm*—Emerson & Associates; Roger D. Emerson; John M. Skeriotis

[57] ABSTRACT

An adjustable seat assembly and method of assembly for a riding lawn mower having at least one channel in a seat bracket whereby the operator can manually adjust the position of the seat. Guideposts located on the lower surface of the seat slide within the channel and provide support against a rocking motion. A lever attached to a seat bracket locks the seat in a position comfortable for the operator. The method includes assembling the seat to the seat bracket without the use of tools.

22 Claims, 8 Drawing Sheets

METHOD AND APPARATUS FOR ASSEMBLY OF A RIDING LAWN MOWER SEAT

BACKGROUND OF THE INVENTION

I. Field of the Invention

This invention pertains generally to the art of apparatuses and methods of attaching a seat assembly to a lawn mower, and more specifically, to an apparatus and method to quickly assemble an adjustable seat to a riding lawn mower without the use of tools.

II. Description of the Related Art

Generally, riding lawn mowers have a non-adjustable seat mounted to the riding lawn mower. In the typical arrangement, the seat is hinged at its forward extremity and may be pivoted forwardly and upwardly about a pivot point generally near the front of the seat. However, the forward and upward movement is only to allow access to various components located directly below the seat. Typically, items such as transmission and power take-off components are located directly below the seat. There is usually no means to adjust a seat on the riding lawn mower for comfort purposes. Therefore, the manufacturer provides a predetermined seat location to accompany the majority of operators.

Manufacturers of lawn mowers ship the seat unassembled. The retailer, upon receiving the lawn mower from the manufacturer, installs the seat as part of the mower assembly process prior to sale. The seat is assembled using a variety of tools including wrenches, ratchets, etc. Retailers generally would prefer not to assemble the seat to the lawn mower, since such assembly process takes time away from more profitable activities such as selling the mowers to customers.

Prior art devices allow the seat to tilt forward and upward but only to access materials below and are not designed to provide a comfortable location for the operator while operating the vehicle.

The present invention contemplates a new and improved lawn mower seat which is simple in design, effective in use, and overcomes the foregoing difficulties and others while providing better and more advantageous overall results.

SUMMARY OF THE INVENTION

An adjustable seat assembly for a riding lawn mower is disclosed. The riding lawn mower has a frame and a steering wheel. The seat has a lower surface and an upright backrest portion. Guideposts are located on the lower surface of the seat. There are preferably a first, second, third and fourth guidepost. Each of the guideposts has a head, a base and a body. The guideposts can be located equidistantly apart from one another.

A seat bracket has a spring opening, a first and second channel, a first and second downturned end, a first and second downturned portion, a first and second extension, a first and second mounting means, a upper and lower surface, and a connecting means located on the mower body. The mounting means mounts the seat position selector to the lower surface of the seat. The first and second extensions each have a hole. The second downturned end has a first opening and a second opening. The first and the second channels have a width W1. The first and second channel each have first and second end. The first opening coincides with the second end of the first channel. The second opening coincides with the second end of the second channel. The first and second openings have a width W3. The first channel accepts and receives the third and the fourth guideposts while the second channel accepts and receives the first and the second guideposts. The first and the second channels are preferably in a parallel relationship to one another. The adjustable seat assembly preferably has the same number of openings as channels.

An alternative embodiment of the seat bracket does not have a second downturned end and therefore no first and second opening. The channels of the seat bracket accept the guideposts themselves which deflect and/or compress to allow insertion within the channels.

The body portion of the guideposts movable within the channels. The head and the base of the guideposts are preferably circular and have an outer periphery greater than the width W1 of the channels. Where the guideposts are not circular, for example square, the width W2 of the base is greater than the width W1 of the channels. Preferably, the width W2 of the base is equal to, or greater than, the width W1 of the channel.

The spring opening has a knob portion. A spring has a first and second end. The knob portion of the spring opening is within the second end of the spring.

A lever has a first end, a second end, an engaging portion, an edge, a spring engager, at least one slot, and a first and second slanted portion. The spring engager is within the second end of the spring.

A seat position selector has a first and second end, a first and second hole, and a first and second side. The first hole is located at the first end and the second hole is located at the second end. The second side has at least one slot and the slot is able to accept the engaging portion of the lever. The seat position selector is attached to the lower surface of the seat.

A stop has a first and second arm each having a center, a slanted portion, a downturned portion, and a flat end. The first and second arms each has a hole within their center. A first mounting means mounts the arms to the lower surface of the seat bracket. The slanted portion extends into the downturned portion and the downturned portion extends into the flat end. The stop is able to deflect to allow only the first guidepost to proceed past the stop.

A method for assembling a seat to a lawn mower is also disclosed herein. A lawn mower has a seat bracket attached and the seat bracket has at least one channel with a first end. A stop is located within only one channel and is in an undeflected position U. The method comprises positioning the seat which has at least one guidepost attached to its lower surface. The guidepost has a base and the base is placed through the first end of the channel. The seat is then slid along the channel until it deflects the stop to a maximum deflection D thereby engaging the guidepost with the stop. The seat is slid to a point just passed the stop whereby the stop returns to its undeflected position U. A lever is engaged to lock the seat into an initial position thereby preventing the seat from moving.

An alternative method for assembling a seat to a lawn mower is also disclosed. The alternative method comprises positioning the seat having at least one guidepost attached to its lower surface by placing the base through the first end of the channel. Thereafter, a lever is moved and held in a direction to compress a spring which is located within the seat bracket while simultaneously sliding the seat along the channel. A stop is located within only one channel and is in an undeflected position U. The seat is then slid along the channel until it deflects the stop to a maximum deflection D thereby engaging the guidepost with the stop. The seat is slid to a point just passed the stop whereby the stop returns to its undeflected position U. The lever is then released to lock the seat into an initial position thereby preventing the seat from moving.

Where the seat bracket has downturned portions, the guidepost is placed through the opening of the downturned portion of the seat bracket.

It is therefore an object of the present invention to provide an adjustable seat for a riding lawn mower.

It is a further object of the present invention to provide a quick and easy assembly of the seat to the lawn mower.

It is yet a further object of the present invention to provide a quick and easy assembly of the seat to the riding lawn mower needing no tools.

It is a further object of the present invention to provide an improved method for assembling the seat to the riding lawn mower.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
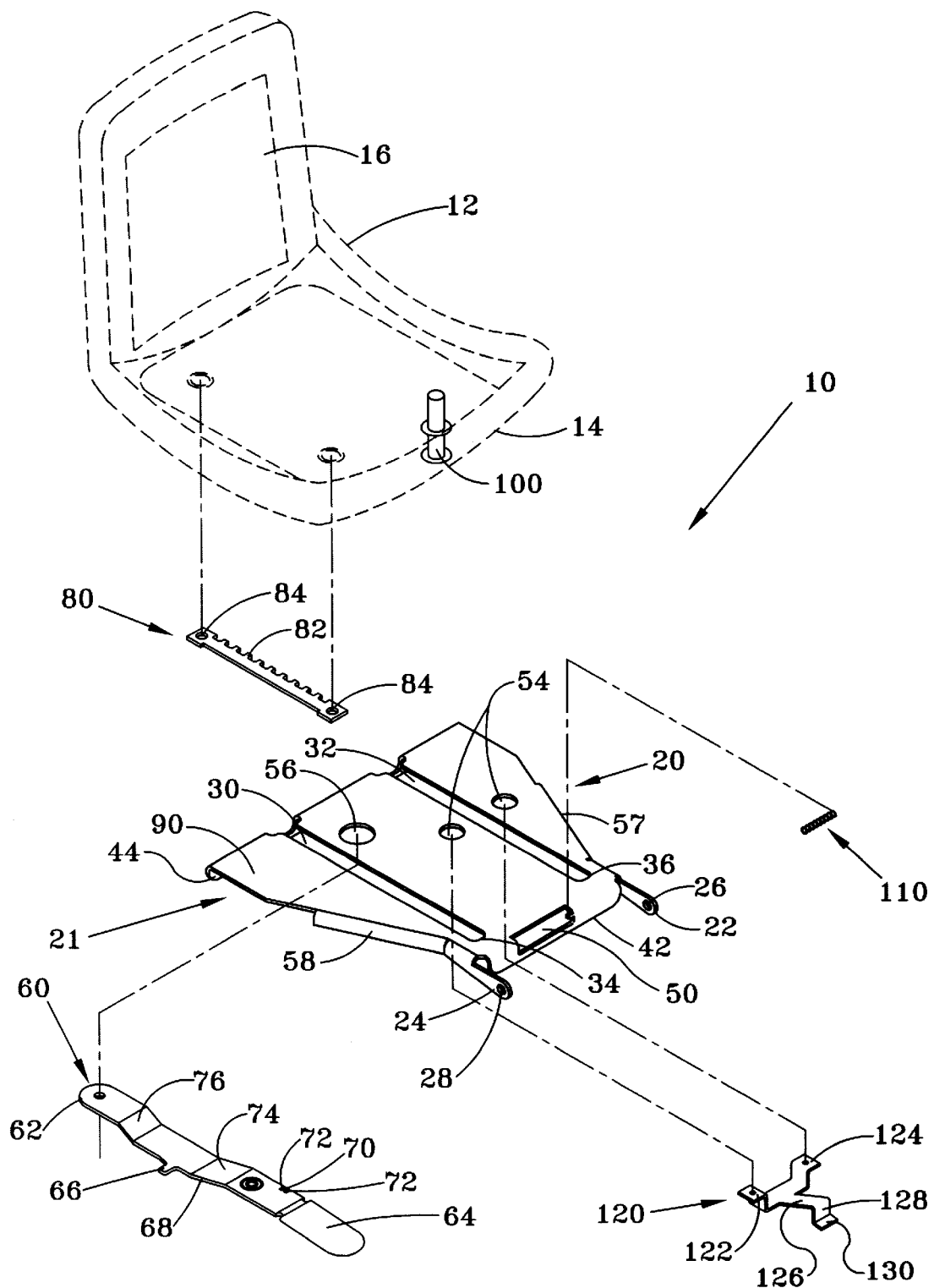
FIG. 1 is an exploded perspective view of the adjustable seat assembly.

Referring now to the drawings, which are for purposes of illustrating a preferred embodiment of the invention only, and not for purposes of limiting the invention, FIG. 1 shows the seat adjustment assembly 10 having a seat 12, a seat bracket 20, a guide post 100, a spring 110, a stop 120, a lever 60, and a seat position selector 80. The seat 12 has a lower surface 14 and an upright backrest portion 16. The seat 12 can take a variety of different shapes and forms.

The seat bracket 20 is mounted to the tractor body (not shown) through first extension 22 and second extension 24. Extensions 22, 24 have holes 26, 28 to allow mounting of the seat bracket 20 to the mower body. Extensions 22, 24 are attached to the tractor body by various means known within the art. The seat bracket 20 pivots about holes 26, 28. This pivoting allows the seat 12 to be rotated upwardly towards the front of the mower (i.e. towards the steering wheel) to allow access to the area below the seat 12 or for access to the transmission and/or power take-off components.

Figure 2:
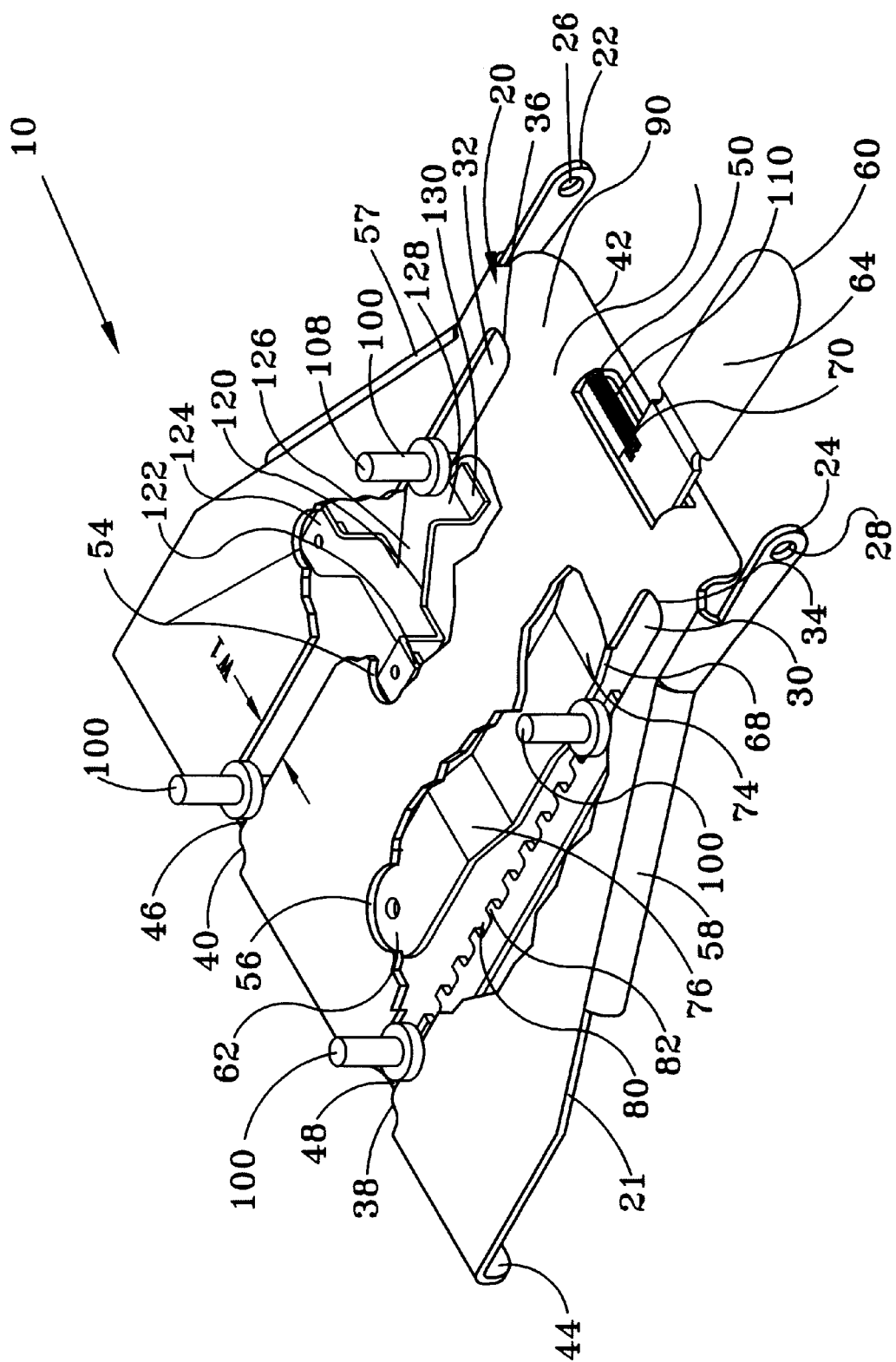
FIG. 2 is a perspective view of the top of the seat bracket of the present invention.
Figure 3:
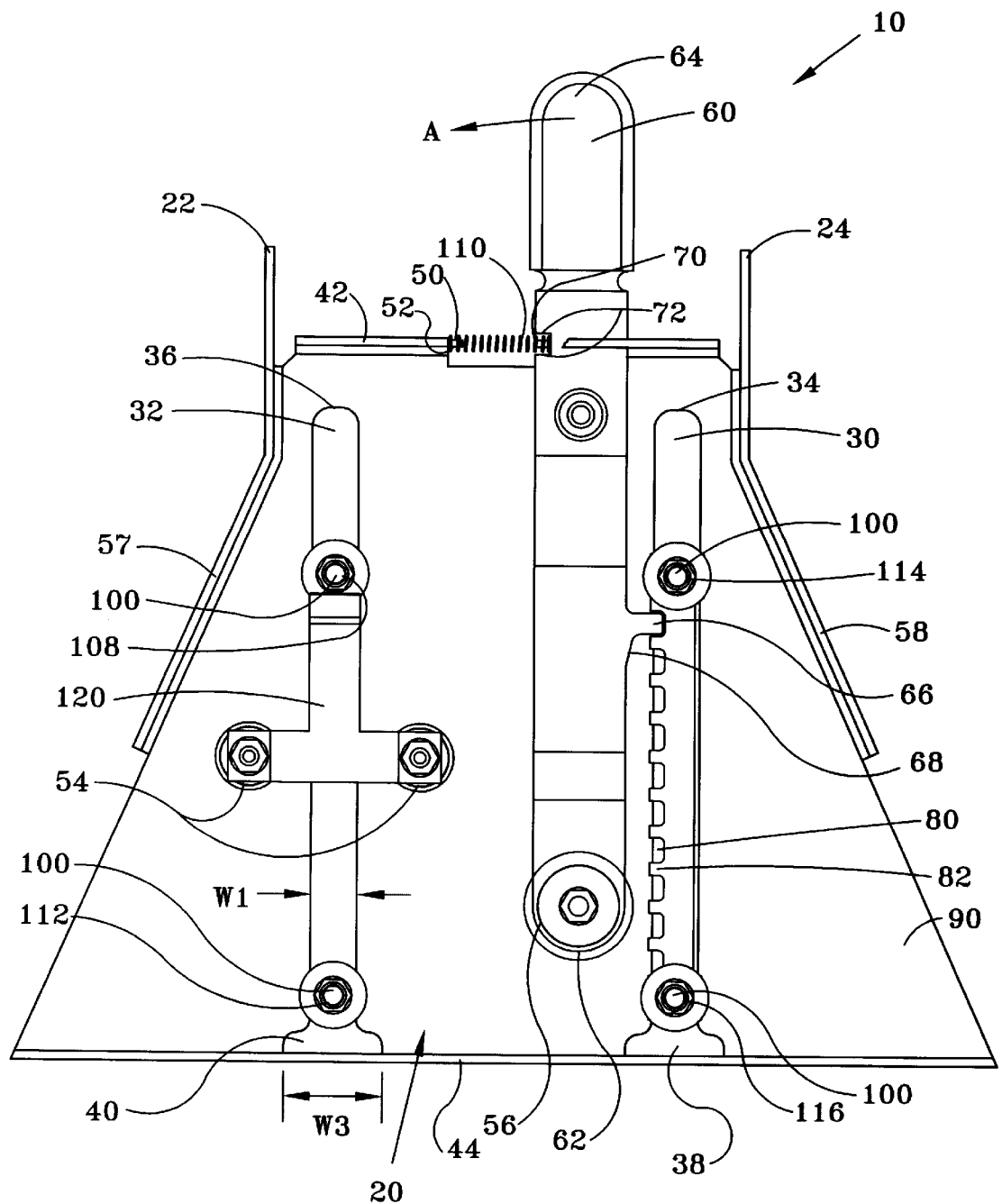
FIG. 3 is a top view of the seat bracket of the present invention.
Figure 4:
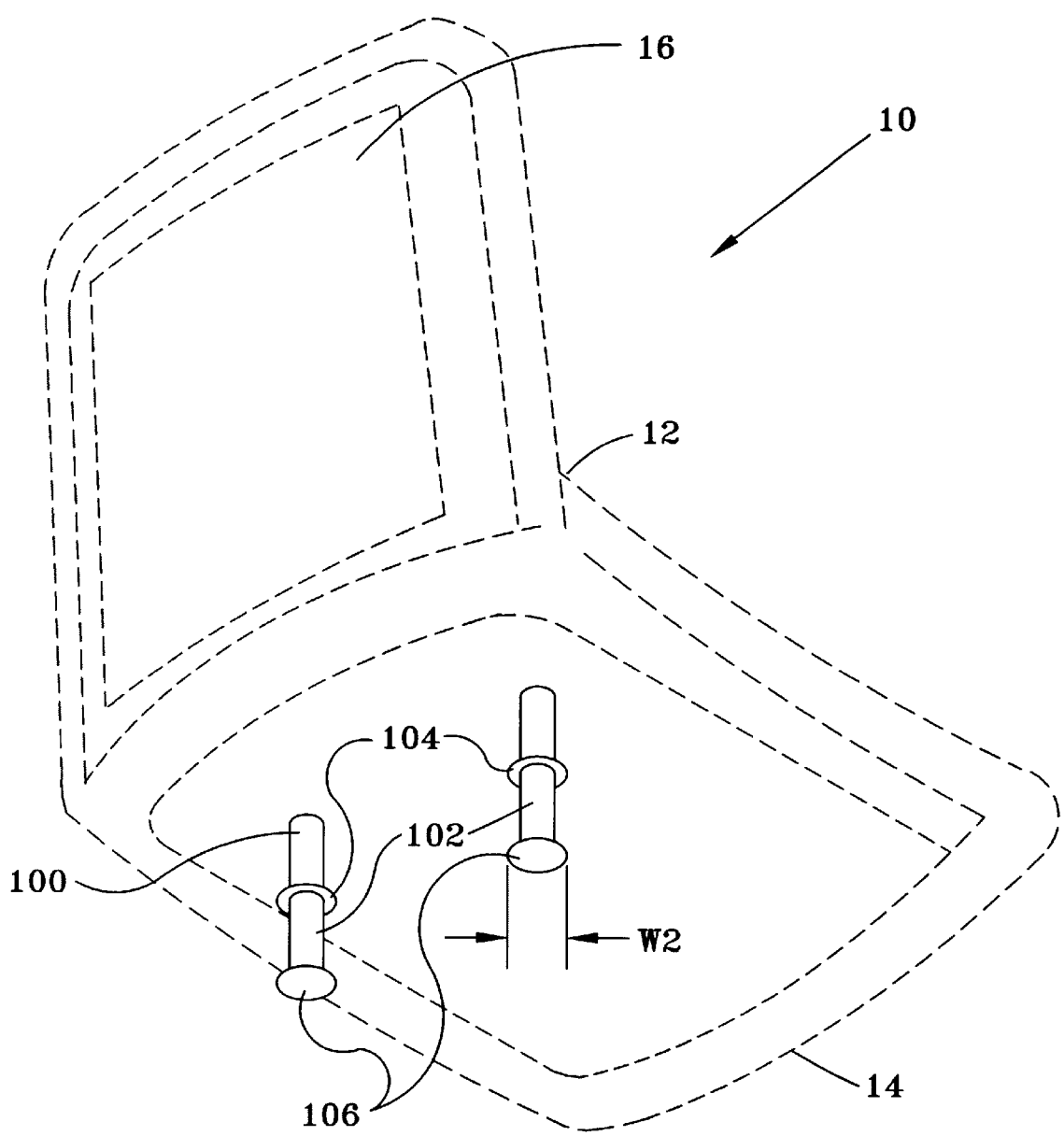
FIG. 4 is a perspective view showing the seat having the guideposts incorporated therein.

The seat bracket 20 will be now described further with reference to FIGS. 1–3. The seat bracket 20 has at least one channel 30 and will be described with reference to its preferred embodiment of having a first channel 30 and a second channel 32. The channels 30, 32 are preferably parallel to one another and are the same length. Each channel 30, 32 has a terminal end 34, 36 and an open end 38, 40. The seat bracket 20 has a first downturned end 42 and a second downturned end 44. The second downturned end 44 has a first opening 46 and a second opening 48. The openings 46, 48 coincide with first and second open ends 38, 40 of channels 30, 32. Openings 46, 48 must be large enough to allow guide posts 100 to pass therethrough.

The seat bracket 20 further has a spring opening 50. The spring opening 50 has a knob portion 52 which accepts a spring 110. The spring opening 50, as shown in FIG. 2, consists of a cylindrical cavity for accepting the spring 110. FIG. 3 shows the knob portion 52 contained within spring 110. The spring 110 can be welded or permanently attached by other means to the knob portion 52 or attached in a non-permanent manner.

The seat bracket 20 has first mounting means 54 which allows the mounting of a stop 120 to the seat bracket 20. In the preferred embodiment, the first mounting means 54 consists of a pair of threaded holes in order to mount the stop 120 thereto. The seat bracket 20 has a second mounting means which secures a lever 60 to the mounting bracket 20. In the preferred embodiment, the second mounting means 56 consists of a through hole having a bolt and nut arrangement. Second mounting means 56 must allow the lever 60 to rotate in direction A which would compress spring 110. This direction is shown in FIG. 3 as arrow A.

The seat bracket 20 has a first downturned portion 57 and a second downturned portion 58. As stated above, the seat bracket 20 also has first and second downturned ends 42, 44. These downturned ends typically fit over or within a mating surface on the mower body.

Figure 6:
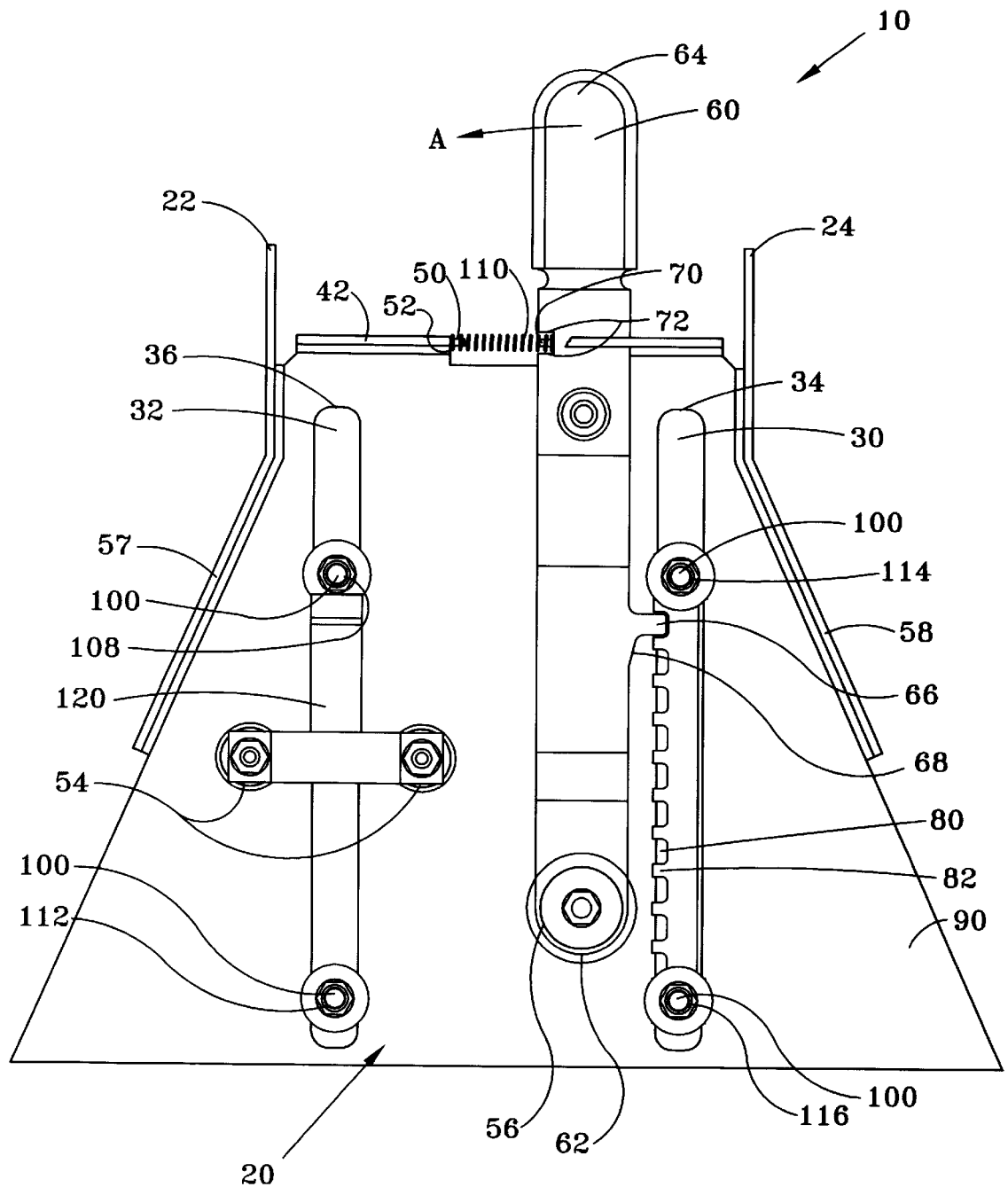
FIG. 6 is a top view of an alternative embodiment of the seat bracket of the present invention.
Figure 7:
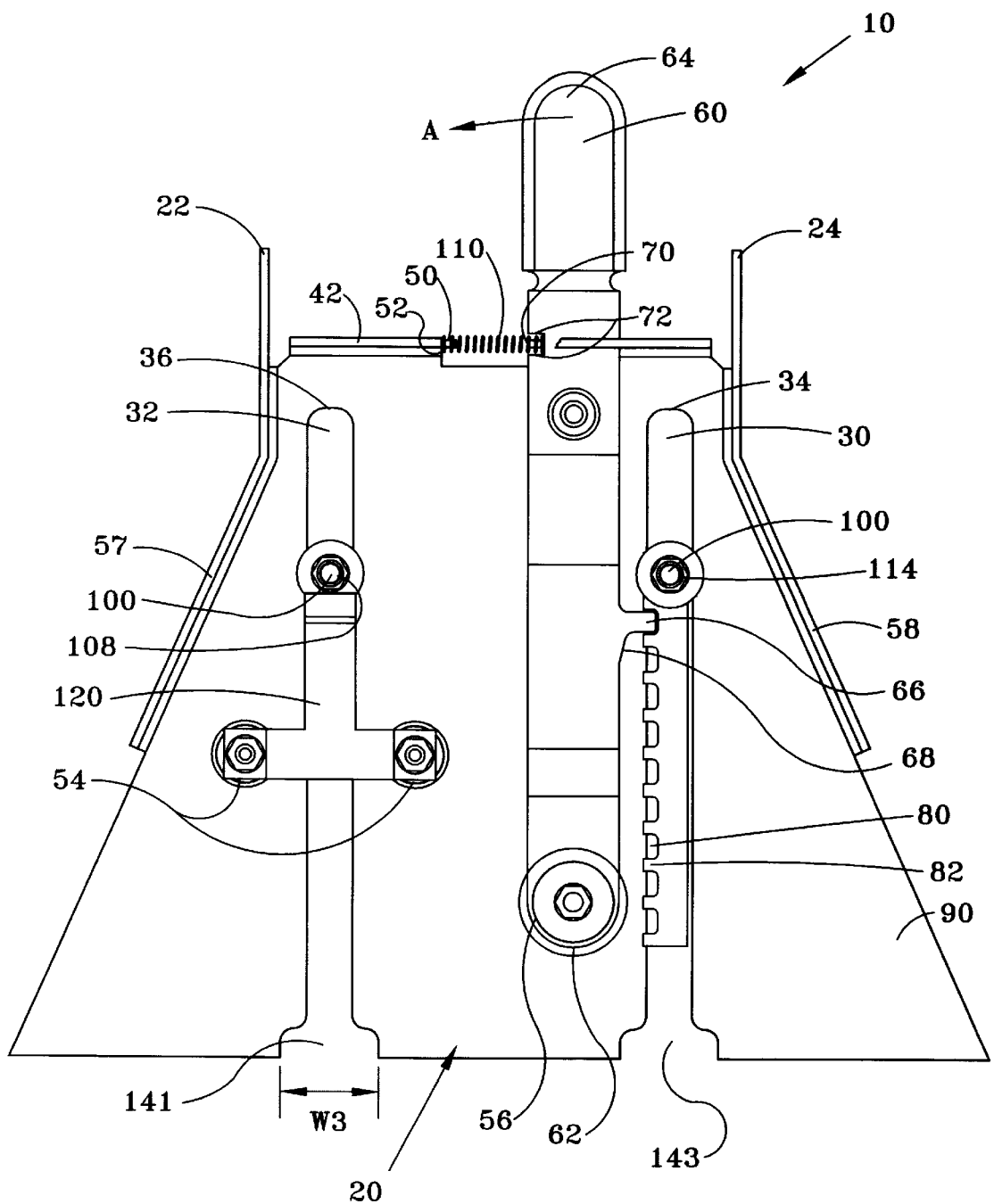
FIG. 7 is a top view of an alternative embodiment of the seat bracket of the present invention.

FIGS. 6 and 7 show alternative embodiments of the seat bracket 20. FIG. 6 shows the seat bracket 20 having no openings 38, 40 and also no downturned portion 44. In this embodiment, the guideposts 100 have a base which can resiliently yield (compress) and be pushed through the channel 30 thereafter expanding once within the slot to its original position. A downturned portion 44 may be used in the embodiment shown in FIG. 6 but have no openings 38, 40.

Figure 5:
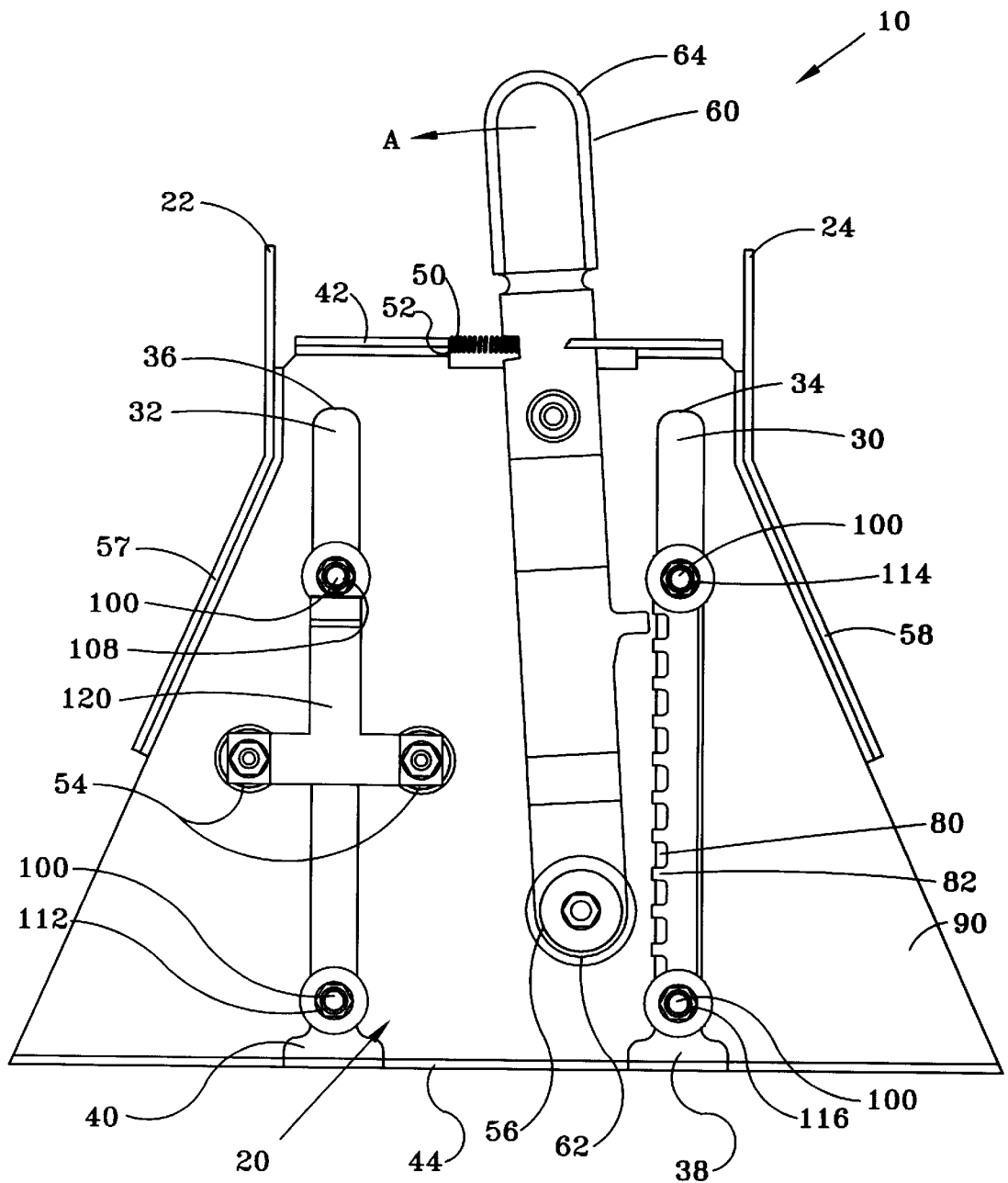
FIG. 5 is a top view of the seat bracket showing the lever 60 in the open position.

FIG. 7 shows an alternative embodiment of the seat bracket 20 having no downturned portion 44 but wherein the channels 30, 32 have openings 141, 142. In this embodiment, the method of insertion of the guideposts 100 into the seat bracket 20 is similar to the preferred embodiment as shown in FIG. 5. The base of the guideposts 100 is slid within the channel 30 in the same manner as that of the preferred embodiment disclosed above.

FIG. 1 shows lever 60 of the seat adjustment assembly 10 while FIGS. 2 and 3 show the lever 60 assembled to the seat bracket 20. The lever 60 has a first end 62 which is mounted to the seat bracket 20 by second mounting means 56. The lever 60 has an engaging portion 66 which extends from edge 68. The engaging portion 66 is shown in FIGS. 1 and 3 in an upturned position. The function of the engaging portion 66 is to engage with the slots 82 of the later-described seat position selector 80.

With continuing reference to FIG. 1, the second end 64 of the lever 60 has a spring engager 70. As shown in FIGS. 1 and 3, the spring engager 70 in the preferred embodiment consists of slots 72 which define the engager 70. The engager 70 is seated within the spring 110 in the same manner as knob portion 52 of the spring opening 50 is seated within the spring 110.

The lever 60 also has a first slanted portion 74 and a second slated portion 76. The first and second slanted portions 74, 76 allow for better engagement of the engaging portion 66 to the seat position selector 80. However, slanted portion 74, 76 could also be angled at 90° instead of being slanted. In addition, lever 60 could also be straight, i.e., having no inclined or angled portions and still operate effectively.

As shown in FIG. 1, a seat position selector 80 is mounted to the lower surface 14 of the seat 12. The seat position selector 80 has a plurality of slots 82 which accept the engaging portion 66 of the lever 60. The seat position selector 80 allows the operator to select different positions of the seat 12. The number of slots 82 are limited by upon the location of the guideposts 100 within the channels 30, the stop 120 and the length of the channels 20. The closer the guideposts 100 are located to one another the greater the travel of the seat 12 within the channel 30. The seat position selector 80 is typically mounted to the seat 12 by screws (not shown) through holes 84 within the seat position selector 80.

Guideposts 100 are shown in FIGS. 1–7. Guideposts 100 are located along lower surface 14 of the seat 12. The guideposts 100 consist of a body 102, an upper portion or head 104, and a lower surface or base 106. The base 106 must be smaller than the first and second openings 46, 48 of the second downturned end 44 of the seat bracket 20. The base 106 and head 104 portions must be larger than the width W1 of the channels 30 which are constant through the length of the channels 30. This ensures that the guideposts 100 and hence, the seat 12, will be constrained within the channels 30 of the seat bracket 20. The guideposts 100 are mounted to the lower surface 14 by various means known within the art. There are preferably two guideposts 100 within each channel 30. This provides stability for the front and the rear of the seat 12 and discourages rocking of the seat 12. Having more guideposts 100 might lead to better stability but might diminish the amount of seat adjustment. The length of travel would be affected in that the guideposts 100 would need to be spaced apart further. The adjustment of seat 12 described thus far is in forward-to-rear movement with respect to the steering wheel (not shown).

The base 106 of the guideposts 100 can have a variety of shapes and still be within the scope of this invention. Where the base 106 is circular, and therefore has an outer periphery, the diameter of the outer periphery is regarded as the width W2. In other configurations, W2 corresponds to the width of the base 106 as it is commonly denoted. Preferably, the width W2 of the base 106 is equal to, or greater than, the width W1 of the channel 30.

With reference to FIGS. 1 and 2, a stop 120 is attached to the seat bracket 20 through first mounting means 54. The stop has a first and second arm 122, 124 which are secured to the underside 21 of the seat bracket 20. A slanted portion 126 extends into a downturned portion 128 which terminates in a flat end 130. As shown in FIG. 2, the stop 120 is assembled so that the flat end 130 is towards the second terminal end 36 of the second channel 32. The stop 120 is assembled so that the slanted portion is slanted upwards towards the upper surface 90 of seat bracket 20. The stop 120 can have many different configurations and still be within the scope of this invention.

The operation and assembly of the seat adjustment assembly 12 will be discussed herein. Typically, the seat 12 comes disassembled from the mower body when shipped to the retailer. According to this invention, the seat position selector 80 and the guideposts 100 will be installed by the manufacturer within seat 12. Accordingly, the lever 60, spring 110 and stop 120 will also be attached to seat bracket 20 by the manufacturer. Likewise, the seat bracket 20 will be installed to the mower body through extensions 22, 24.

Figure 8:
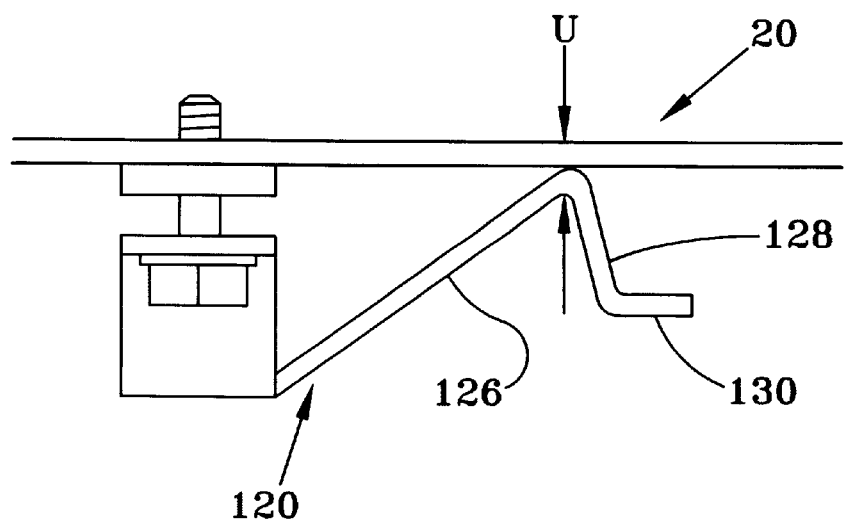
FIG. 8 shows the stop at its undeflected position U.
Figure 9:
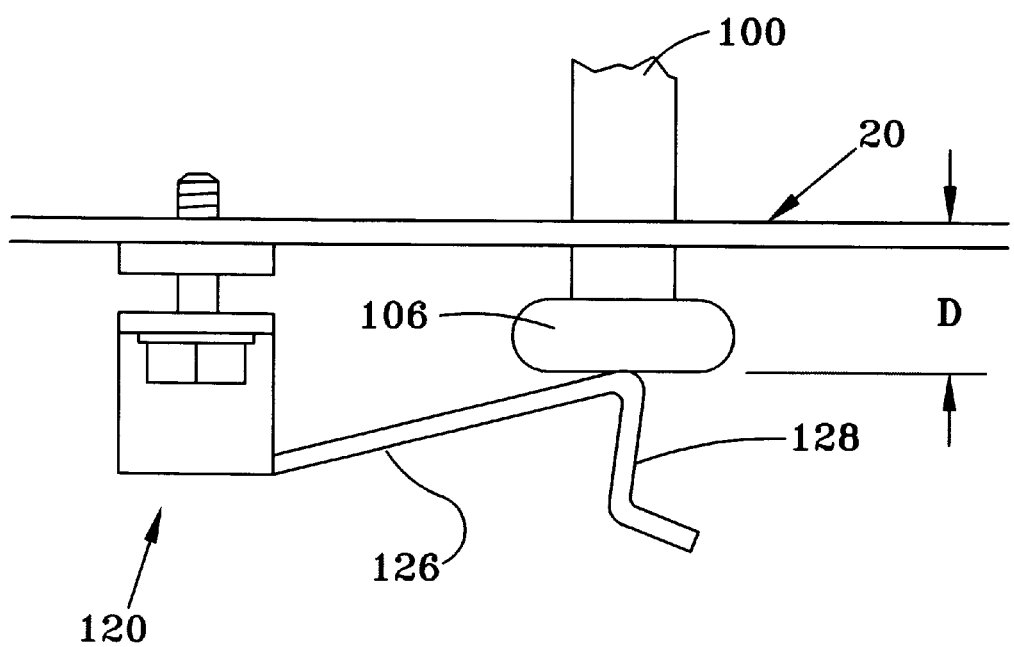
FIG. 9 shows the stop at its maximum deflection position D.

The assembly method described herein will be in accordance with the invention described thus far and having first guidepost 108, second guidepost 112, third guidepost 114, and fourth guidepost 116. The seat assembly further includes the seat bracket 20 having first and second channels 30, 32 and the stop 120 located within second channel 32. The stop 120 is in an undeflected position U as shown in FIG. 8. The inventive method to assemble the seat 12 to the lawn mower begins by positioning the seat 12 by placing the first and third guideposts 108, 114 within the openings 46, 48 of the second downturned end 44. Thereafter, the seat 12 has the guideposts 108, 114 slide within the channels 30, 32 through their open ends 38, 40. The guideposts 108, 113, slide within the channels 30, 32 and deflect the stop 120 to a maximum deflection D. Such maximum deflection D pushes the first guidepost 108 to pass under or through the stop 120 as shown in FIG. 9. The lever is then engaged to lock the seat into an initial position by engaging the engaging portion 66 within a slot 82 in the seat position selector 80. In the above mentioned method, the lever 60 is held in its open position by some type of holding means which can be a strap, rope or other method (not shown). This holding means is preferably supplied by the manufacturer. The open position of the lever 60 is where the spring 110 is compressed so that the seat position selector 80 is able to slide within the channel 30 without interference from the engaging portion 66 of the lever 60 and is shown in FIG. 5. The closed, or locked position is shown in FIG. 3 where the engaging portion 66 is within a slot 82.

Another embodiment of the inventive assembly method can be used where the lever 60 is not secured to its open position. In this method, an additional step after sliding the seat 12 within the channels 30 would be needed. The step would include moving and holding the lever 60 in the open position while simultaneously sliding the seat 12 within the channels 30, 38 to a point just past and after the maximum deflection D deflection of the stop 120 as shown in FIG. 9. Thereafter one can release the lever 60 to lock the seat 12 into an initial position.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. An adjustable seat assembly which is attached to a riding lawn mower, the riding lawn mower having a frame, a steering wheel, said adjustable seat assembly comprising:
    a seat having a lower surface and an upright backrest portion;
    a first, second, third and fourth guidepost, each of said guideposts having a head, a base and a body, said head being located substantially in the middle of said body, said base being located at the end of said body, said head, said base, and said body all being integral, said guideposts being located equidistantly apart from one another;
    a seat bracket, said seat bracket having connecting means for connecting said seat bracket to the frame of the lawn mower, said bracket having a cylindrical cavity for accepting a spring, a first and second channel, said first and second channels being located on opposite sides of said seat bracket, a first and second downturned end, a first and second downturned portion, a first and second extension, a first and second mounting means, a upper and lower surface, said first and second extensions each having a hole, said second downturned end having a first opening and a second opening, said first and said second channels having a width W1, said first channel having first and second ends, said second channel having first and second ends, said first opening coinciding with said second end of said first channel, said second opening coinciding with said second end of said second channel, said first channel able to accept said third and said fourth guideposts, said second channel able to accept said first and said second guideposts, said first and said second channels being parallel to one another, said body portion of said guideposts able to move within said channels, said head and said base of said guideposts being circular and having an outer periphery greater than said width W1 of said channels, said spring opening having a knob portion, said connecting means connecting said seat bracket to the frame of the lawn mower by said holes in said extensions;

said spring having a first and a second end, said knob portion of said cylindrical cavity for receiving said spring being within said second end of said spring, said first end connected to a lever;

said lever having a first end, a second end, an engaging portion, an edge, a spring engager, at least one slot, a first and second slanted portion, said spring engager being within said second end of said spring, said lever being attached to said seat bracket by second mounting means;

a seat position selector, said seat position selector being attached to said seat bracket by said third and said fourth guideposts, said seat position selector having a first and second end, a first and second hole, a first and second side, said first hole located at said first end and said second hole located at said second end, said second side having at least one slot, said slot able to accept said engaging portion of said lever, said seat position selector being attached to said lower surface of said seat; and a stop, said stop being attached to said seat bracket beneath said second channel, said stop having a first and a second arm each having a center, a slanted portion, a downturned portion, and a flat end, said first and said second arms each having a hole within said center, said first mounting means mounting said arms to said lower surface of said seat bracket, said slanted portion extending into said downturned portion, said downturned portion extending into said flat end, said stop able to deflect to allow only said first guidepost to proceed past said stop.

2. An adjustable seat assembly which is attached to a riding lawn mower, the riding lawn mower having a frame, a steering wheel, said adjustable seat assembly comprising:

a seat having a lower surface and an upright backrest portion;

a seat bracket, said seat bracket having a upper and lower surface, and at least one channel, said channel having a first and second end, and a width W1, said seat bracket having a connecting means, said connecting means connecting said seat bracket to the frame of the lawn mower;

a stop, said stop attached to said seat bracket, said stop able to deflect upwardly;

at least one guidepost, said guidepost having a base and a body, wherein said guidepost deflects said stop upwardly; and wherein said guidepost is inserted into said channel for movement therein.

3. The adjustable seat assembly as recited in claim 2 wherein said seat bracket further comprises a downturned portion, said downturned portion having at least one opening, said opening coinciding with said second end of said channel, the adjustable seat assembly having the same number of said openings as said channels.

4. The adjustable seat assembly as recited in claim 3 wherein said base of said guidepost further comprises a width W2, said width W2 of said base being equal to, or greater than, said width W1 of said channel.

5. The adjustable seat assembly as recited in claim 3 further comprising:

a mounting means; and a seat adjustment means, said seat adjustment means having a lever and a seat position selector, said lever having a first end, a second end, and an upturned portion, said seat position selector having a first end, a second end, a first side, a second side, said second side having slots, said slots able to accept said upturned portion of said lever, said mounting means mounting said seat position selector to said lower surface of said seat.

6. The adjustable seat assembly as recited in claim 5 further comprising:

a spring, said spring having a first end and a second end, said first end of said spring engaged with said lever;

and wherein said seat bracket further comprises a spring opening accepting said spring.

7. The adjustable seat assembly as recited in claim 3 wherein said adjustable seat assembly further comprises four substantially equidistant guideposts.

8. The adjustable seat assembly as recited in claim 3 wherein said adjustable seat assembly further comprises two substantially parallel channels.

9. The adjustable seat assembly as recited in claim 8 wherein said channels are parallel to one another.

10. The adjustable seat assembly as recited in claim 3 wherein said stop further comprises a slanted portion and a downturned portion, said stop attached to said lower surface of said seat bracket.

11. The adjustable seat assembly as recited in claim 3 wherein said opening has a width W3, said width W3 of said downturned portion is larger than said width W2 of said base of said guidepost.

12. The adjustable seat assembly as recited in claim 2 wherein said base of said guidepost further comprises a width W2, said width W2 of said base being equal to, or greater than, said width W1 of said channel.

13. The adjustable seat assembly as recited in claim 2 further comprising:

a mounting means; and a seat adjustment means, said seat adjustment means having a lever and a seat position selector, said lever having a first end, a second end, and an upturned portion, said seat position selector having a first end, a second end, a first side, a second side, said second side having slots, said slots able to accept said upturned portion of said lever, said mounting means mounting said seat position selector to said lower surface of said seat.

14. The adjustable seat assembly as recited in claim 13 further comprising:

a spring, said spring having a first end and a second end, said first end of said spring engaged with said lever; and wherein said seat bracket further comprises a spring opening accepting said spring.

15. The adjustable seat assembly as recited in claim 2 wherein said adjustable seat assembly further comprises four substantially equidistant guideposts.

16. The adjustable seat assembly as recited in claim 2 wherein said adjustable seat assembly further comprises two substantially parallel channels.

17. The adjustable seat assembly as recited in claim 16 wherein said channels are parallel to one another.

18. The adjustable seat assembly as recited in claim 2 wherein said stop further comprises a slanted portion and a downturned portion, said stop attached to said lower surface of said seat bracket.

19. A method for assembling a seat to a lawn mower, the lawn mower having a seat bracket, the seat bracket having at least one channel, the channel having a first end, and a stop located within only one channel and being in an undeflected position U, the method comprising:

positioning a seat having at least one guidepost attached to its lower surface, said guidepost having a base, by placing said base through the first end of the channel;

sliding said seat along the channel;

deflecting the stop to a maximum deflection D by sliding said seat along the channel thereby engaging said guidepost with the stop;

sliding said seat to a point just passed the stop whereby the stop returns to its undeflected position U; and, engaging a lever, said lever being attached to the seat bracket, to lock said seat into an initial position thereby preventing said seat from moving.

20. A method for assembling a seat to a lawn mower, the lawn mower having a seat bracket attached, the seat bracket having at least one channel, the channel having a first end, and a stop located within only one channel and being in an undeflected position U, the method comprising:

positioning a seat having at least one guidepost attached to its lower surface, said guidepost having a base, by placing said base through the first end of the channel;

moving and holding a lever in a direction to compress a spring located within the seat bracket while simultaneously sliding said seat along the channel, said lever being attached to the seat bracket;

deflecting the stop to a maximum deflection D by sliding said seat along the channel thereby engaging said guidepost with the stop;

sliding said seat to a point just passed the stop whereby the stop returns to its undeflected position U; and, releasing the lever to lock said seat into an initial position thereby preventing said from moving.

21. A method for assembling a seat to a lawn mower, the lawn mower having a seat bracket attached, the seat bracket having at least one channel, a downturned portion having at least one opening, the channel having a first end, the number of channels and number of openings being equal, the opening of the downturned portion coinciding with the channel opening, and a stop located within only one channel and being in an undeflected position U, the method comprising:

positioning a seat having at least one guidepost attached to its lower surface, said guidepost having a base, by placing said base through the opening of the downturned portion of the seat bracket;

moving and holding a lever in a direction to compress a spring located within the seat bracket while simultaneously sliding said seat within and along the channel, said lever being attached to the seat bracket;

deflecting the stop to a maximum deflection D by sliding said seat along the channel thereby engaging said guidepost with the stop;

sliding said seat to a point just passed the stop whereby the stop returns to its undeflected position U; and, releasing said lever to lock said seat into an initial position thereby preventing said seat from moving.

22. A method for assembling a seat to a lawn mower, the lawn mower having a seat bracket attached, the seat bracket having at least one channel, a downturned portion having at least one opening, the channel having a first end, the number of channels and number of openings being equal, the opening of the downturned portion coinciding with the channel opening, and a stop located within only one channel and being in an undeflected position U, the method comprising:

positioning a seat having at least one guidepost attached to its lower surface, said guidepost having a base, by placing said base through the opening of the downturned portion of the seat bracket;

sliding said seat along the channel;

deflecting the stop to a maximum deflection D by sliding said seat along the channel thereby engaging said guidepost with the stop;

sliding said seat to a point just passed the stop whereby the stop returns to its undeflected position U; and, engaging a lever to lock said seat into an initial position thereby preventing said seat from moving, said lever being attached to the seat bracket.

* * * * *